Dec. 16, 1958  B. F. CIRLIN  2,864,604
ELECTRO-MAGNETIC BALANCE
Filed April 8, 1955
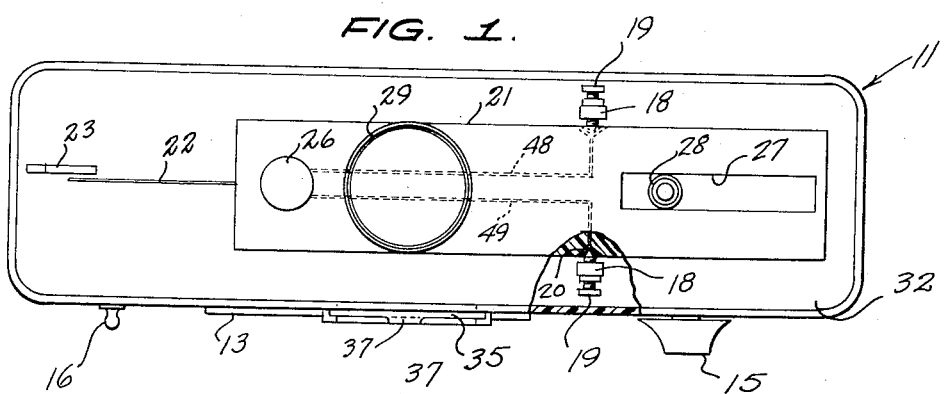
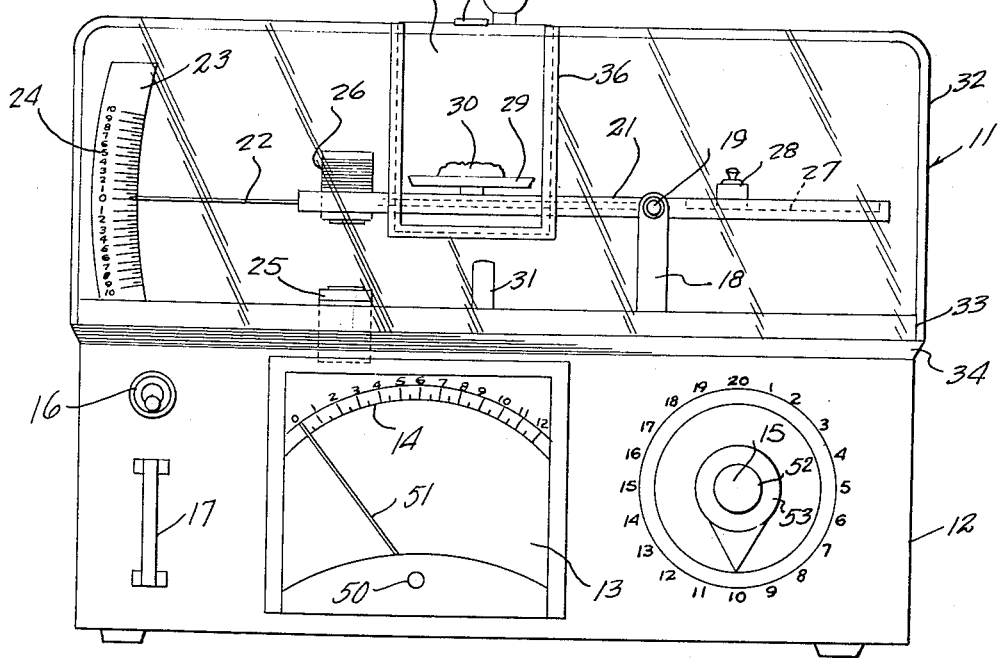
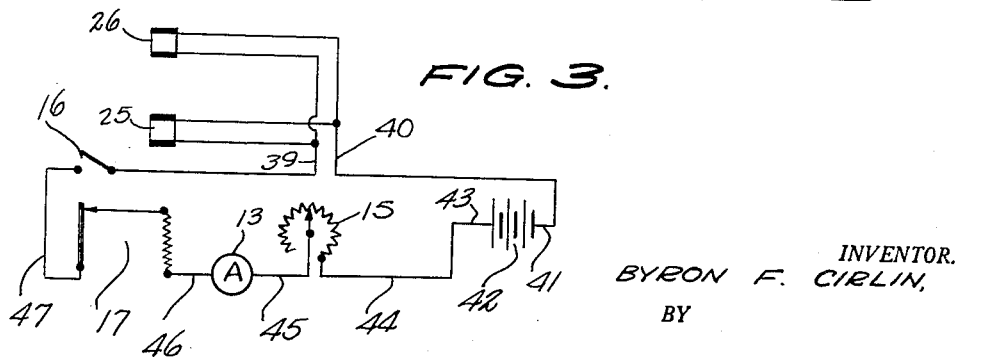
INVENTOR.
BYRON F. CIRLIN,
BY
McMorrow, Berman + Davidson
ATTORNEYS.

United States Patent Office 2,864,604
Patented Dec. 16, 1958

2,864,604

ELECTRO-MAGNETIC BALANCE

Bryon Fair Cirlin, Miami Beach, Fla.

Application April 8, 1955, Serial No. 500,123

1 Claim. (Cl. 265—27)

This invention relates to electrical weighing apparatus, and more particularly to an electro-magnetic device of the repulsion type.

A main object of the invention is to provide a novel and improved electrical weighing device which is simple in construction, which is easy to adjust for use, and which provides an accurate measurement of weight placed thereon.

A further object of the invention is to provide an improved electro-magnetic balance device of the repulsion type which is relatively inexpensive to fabricate, which is durable in construction, which is adjustable in sensitivity, and which involves relatively few parts.

Further objects and advantages of the invention will become apparent from the following description and claim, and from the accompanying drawings, wherein:

Figure 1 is a top view, partly in horizontal cross section, of an improved electro-magnetic weighing device constructed in accordance with the present invention.

Figure 2 is a front elevational view of the electro-magnetic weighing device of Figure 1.

Figure 3 is a schematic wiring diagram illustrating the electrical connections employed in the electro-magnetic weighing device of Figures 1 and 2.

Referring to the drawings, the improved electro-magnetic weighing device is designated generally at 11 and comprises a main housing 12 which may be of any suitable shape and which has mounted in its front wall an ammeter 13 having a scale 14 calibrated in units of weight, such as grams, or the like. Also mounted on the front wall of the housing 12 is a rheostat 15, said rheostat being located adjacent to the ammeter 13, as shown in Figure 2. The front wall of housing 12 also has mounted thereon the main control switch 16 and the thermostatically operated fuse device 17.

Rigidly secured to the top wall of the housing 12 are the parallel, upstanding support arms 18, 18 to the top ends of which are threaded the respective pivot screws 19, 19, said pivot screws having conical ends pivotally engaging in respective conical pivot cups 20 molded in the opposite sides of the intermediate portion of an armature 21. Armature 21 is thus pivotally supported for rotation around a transverse horizontal axis. Secured to the forward end of the armature 21 and extending longitudinally and forwardly from said armature is a pointer rod 22. Mounted on the forward end portion of the top wall of housing 12 is the upstanding, arcuate plate member 23 carrying a scale 24 having a zero mark at its intermediate portion.

Mounted in the top wall of the housing 12 and underlying the forward end portion of the armature 21 is the vertical electro-magnet 25. Mounted in the forward end portion of the armature 21 in vertical registry with the magnet 25 is the vertical electro-magnet 26 which is arranged in opposition to the electro-magnet 25 so as to repel magnet 25 when both magnets are energized, as will be presently described.

The rear portion of the armature 21 is formed with a longitudinal groove or recess 27 adapted to slidably receive a weight 28 which may be adjusted along the recess 27 to adjust the sensitivity of the weighing apparatus.

Secured on the armature 21 between the pivotal axis defined by the pins 19, 19 and the electro-magnet 26 is the platform member 29 adapted to receive the unknown body 30 whose weight is to be measured.

The top wall of housing 12 is provided with an upstanding stop member 31 which is engageable with the bottom surface of the armature 21 to limit the counter-clockwise rotation of said armature, as viewed in Figure 2.

Designated at 32 is a transparent cover which is receivable over the top of the housing 12, said housing 12 having the inwardly offset peripheral shoulder 33 over which the bottom edge of the transparent cover 32 is engaged, the housing being provided with the supporting shoulder 34 extending therearound so that the cover 32 will be supported in the position thereof shown in Figure 2. The cover 32 is provided with a vertical removable door 35 which is slidably received in a grooved frame 36 provided around an aperture in the front wall of the cover 32, the door 35 having the finger tab 37 in its top edge, whereby the door may be removed by lifting same while grasping the finger tab 37. Thus, convenient access is provided to the platform member 29, since the door 35 is located adjacent the platform 29, as is clearly shown in Figure 2. The main cover 32 is provided on its top wall with a suitable knob 38 which may be utilized when it is desired to lift the cover 32 off the housing 12 to obtain access to the adjustable weight 28, as when it is desired to adjust the sensitivity of the weighing apparatus.

The cover 32 and door 35 are preferably formed of suitable transparent plastic material, providing a clear view of the interior of the elements contained inside the cover, such as the zero adjustment scale 24, the pointer 22, and the like.

As shown in Figure 3, the respective electro-magnets 25 and 26 are connected in parallel to respective conductors 39 and 40. The conductor 40 is electrically connected to one terminal 41 of a suitable battery 42. The other terminal 43 of the battery 42 is connected by a wire 44 to one terminal of the rheostat 15. The other terminal of the rheostat 15 is connected by a wire 45 to one terminal of the ammeter 13. The other terminal of the ammeter is connected by a wire 46 to one terminal of the thermostatic fuse 17. The other terminal of the fuse 17 is connected to the main control switch 16 as by a wire 47.

As shown in Figure 1, the electro-magnet 26 is connected by respective conductors 48 and 49 to the bearing cups 20, said bearing cups being in electrical contact with the pins 19 and the upstanding supporting posts 18, said supporting posts being of conductive material, such as suitable metal, the bearing cups 20 being of suitable metal, whereby the electro-magnet 26 is electrically connected to the post elements 18. The post elements 18 are in turn connected to the respective conductors 39 and 40 inside the housing 12. The main body of the armature 21 is formed of suitable insulating material, such as plastic or the like.

The ammeter 13 is provided with a zero adjusting knob 50 for adjusting the needle 51 of the ammeter to a zero point on the ammeter scale.

In calibrating the device, a known one gram weight is placed on the pan or platform 29, after which the switch 16 is closed. The rheostat 15 is then adjusted to provide sufficient current through the electro-magnets to bring the pointer 22 to the zero position on the scale 24. The adjustment knob 50 of the ammeter 13 is then operated to move the ammeter needle 51 to the one gram position on the ammeter scale.

During the above operation, the sensitivity weight 28 may be moved to provide a desired degree of sensitivity of the weighing apparatus.

After the calibration above described has been completed, the switch 16 may be opened.

In the event that a heavier known standard weight is employed for calibration, as where the balance device is to be employed for weighing heavier unknowns, the same procedure above described is followed except that the adjustment knob 50 of the ammeter 13 is operated to move the meter needle 51 to the point on scale 14 corresponding to the said heavier known standard weight.

In weighing an unknown body, said unknown body is placed on the pan or platform 29, after which the toggle switch 16 is closed. Thereafter, the rheostat 15 is adjusted to a position wherein the pointer 22 is at the zero position on the scale 24. The ammeter 13 will then give a reading equal to the weight of the unknown body.

The rheostat 15 may be of a conventional type provided with coarse and fine adjustments, so that the resistance thereof may be accurately adjusted to bring the pointer 22 accurately to the zero point on the scale 24. Thus, the rheostat 15 may be provided with the concentric coarse and fine adjustment knobs 52 and 53, as shown in Figure 2.

Obviously, a number of modifications may be made on the structure above disclosed, for example, to make the weighing operation completely automatic. The rheostat 15 may be operated automatically by a small electric motor which is energized by the placement of an object on the pan or platform 29, causing the current through the electro-magnets 25 and 26 to be increased a sufficient amount to bring the pointer 22 to the zero position on the scale 24. Suitable switch means may be provided to automatically open the circuit of the electric motor when the pointer 22 reaches the zero position, thus providing the weight reading on the ammeter 13 at this point. If so desired, the switch means may be arranged to open the circuit of the battery 42 at this point, and suitable conventional means, well known in the art, may be provided to retain the reading of the meter needle 51 along the scale of ammeter 13, the meter being previously adjusted to read the maximum current attained. Thus, the weight indication will be retained on the meter scale 14 after the balance arm 21 has rotated to its rest position.

While a specific embodiment of an improved electrical weighing apparatus has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an electrical weighing apparatus, a support, a first electro-magnet mounted on said support, a substantially flat armature of non-conductive material, a pair of upstanding posts on said support, conductive means on said posts pivotally engaging opposite edge portions of said armature and pivotally supporting said armature in a position overlying said first electro-magnet, a second electro-magnet mounted on said armature, means electrically connecting said second electro-magnet through said conductive means in parallel with and opposing said first electro-magnet, a pointer rigidly secured to and projecting horizontally from an end portion of said armature, an upstanding calibrated zero adjustment scale rigidly mounted on said support adjacent said pointer, a rheostat, an ammeter calibrated in weight units, a source of current, circuit means connecting said rheostat, ammeter, said parallel-connected electro-magnets, and source of current in series, whereby the current required to energize said electro-magnets sufficiently to support a weight on the armatuer and to elevate said pointer to a predetermined point on said scale will provide a reading on said ammeter in weight units, said armature being formed with a longitudinal recess opposite said second electro-magnet, and a sensitivity adjusting weight slidably engaged in said recess.

References Cited in the file of this patent

UNITED STATES PATENTS

| | | |
|---|---|---|
| 1,717,462 | Nagaoka et al. | June 18, 1929 |
| 2,279,076 | Sutton | Apr. 7, 1942 |
| 2,351,533 | Molins et al. | June 13, 1944 |
| 2,357,891 | Granberry | Sept. 12, 1944 |
| 2,488,367 | Bernarde | Nov. 15, 1949 |
| 2,675,222 | Clark | Apr. 13, 1954 |

FOREIGN PATENTS

| | | |
|---|---|---|
| 102,936 | Germany | Jan. 27, 1898 |
| 956,911 | France | Aug. 15, 1949 |